Oct. 16, 1956  G. JENDRASSIK  2,766,928
PRESSURE EXCHANGERS
Filed July 19, 1950  3 Sheets-Sheet 2
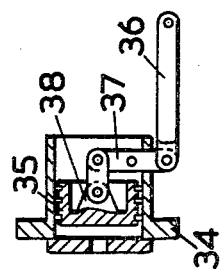
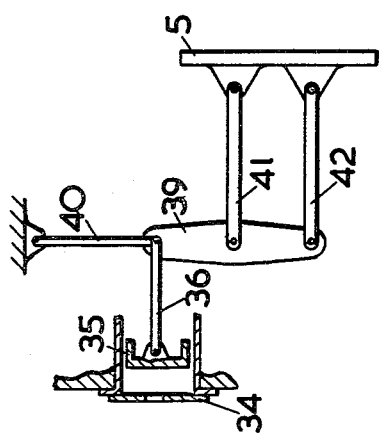
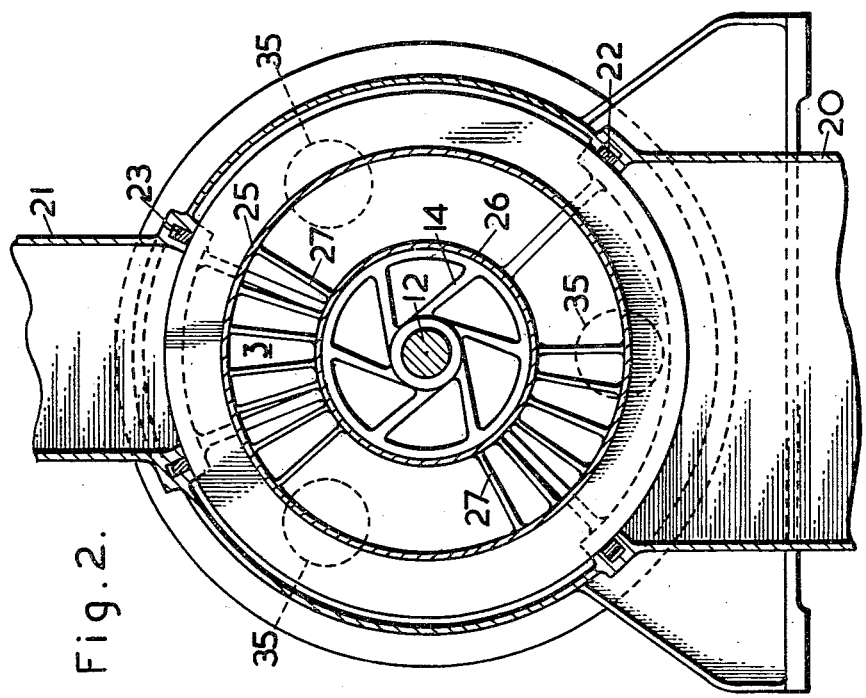
Inventor
George Jendrassik
By
Stevens, Davis, Miller & Mosher
Attorneys Oct. 16, 1956 G. JENDRASSIK 2,766,928
PRESSURE EXCHANGERS
Filed July 19, 1950 3 Sheets-Sheet 3
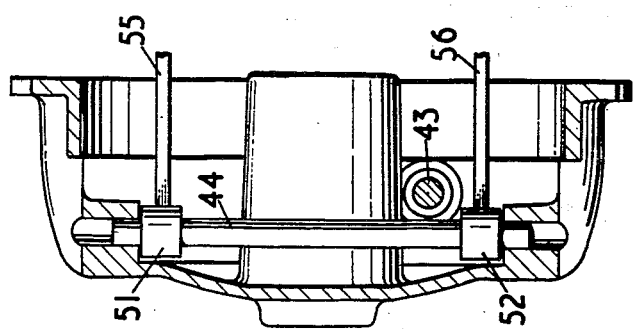
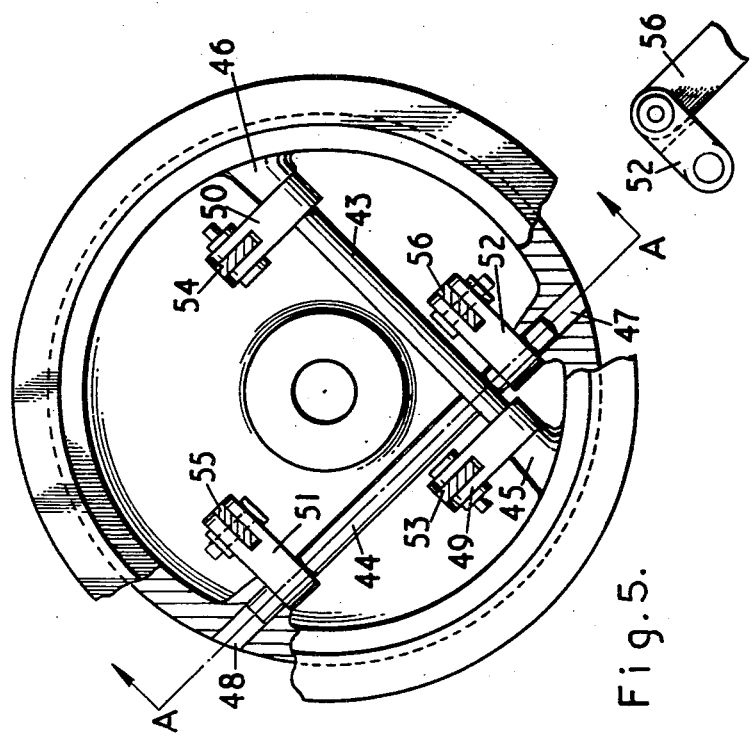
Inventor
George Jendrassik
By Stevens, Davis, Miller & Mosher
his Attorneys United States Patent Office 2,766,928
Patented Oct. 16, 1956

2,766,928

PRESSURE EXCHANGERS

George Jendrassik, London, England; Andre G. T. Boszormenyi and Clara Jendrassik, executors of said George Jendrassik, deceased, assignors, by mesne assignments, to Jendrassik Developments Limited, London, England Application July 19, 1950, Serial No. 174,729

Claims priority, application Great Britain July 25, 1949

9 Claims. (Cl. 230—69)

This invention relates to pressure exchangers, by which term is to be understood rotary machines which compress a gaseous medium by employing the expansion, within the same machine, of another gaseous medium, or of another quantity of the same medium, the compression and expansion taking place in at least one circular series of cells between which and other structure of the machine there is a relative rotation, and the replacement of gas in the cells being effected during low pressure and high pressure scavenging stages in the former of which expanded gas in a cell is replaced by gas to be compressed, and in the latter of which compressed gas in a cell or cells is replaced by gas to be expanded.

In a typical pressure exchanger the cells are disposed to form a rotor to and from which gas is fed by non-rotary distributing means. Alternatively it has been suggested, for certain types of pressure exchanger, to use two rings of cells between which there is relative rotation, or to use a stationary ring of cells in combination with rotary gas distributing means.

Examples of known forms of pressure exchanger are disclosed for instance in British patent specification Nos. 290,669, 427,957, and 553,208, and are illustrative of the art to which the invention relates.

More particularly, the pressure exchanger applied to the present invention is of the type and operates similarly to that described in British Patent No. 553,208, corresponding to U. S. Patent No. 2,399,394. The pressure exchanger broadly includes a rotor positioned between two end plates with cells annularly arranged around its periphery and four main duct connections, through two of which gas flows toward the cells and through two of which gas flows away from the cells. In the passage of gas between the cells of the rotor and the end plates the problem of gas leakage arises. To minimise gas leakage it is essential that the clearance between such an end plate and the adjacent face of the rotor should be as small as possible, and this involves difficulties due to the thermal expansion of the rotor. The main object of the present invention is to provide constructions which permit the said clearance to be small (and to remain substantially constant) while at the same time allowing for thermal growth of the rotor in the axial direction, or for axial displacements of the rotor.

According to the present invention in a pressure exchanger for the expansion of a high pressure fluid simultaneously with compression of a lower pressure fluid comprising at least one circular series or ring of cells, at least one fluid distributing member or end plate arranged adjacent to one end face of the ring of cells for the replacement of fluid axially into the cells during relative rotation of the end plate and ring of cells, the end plate and the ring of cells are constructed and arranged adjacent one another in association with bearing means to permit relative rotation and to fix the axial spacing between them and with the end plate displaceably mounted for axial movement so as to maintain the axial spacing between the ring and the end plate. The bearing means may include at least one bearing for maintaining the axial spacing between the end face of the ring of cells and the end plate. The displaceable end plate may be supported by guide means permitting axial displacement but preventing tilting of the end plate relatively to the ring of cells. One form of the guide means may comprise parallel motion mechanism permitting axial displacement of the end plate without tilting and it may comprise at least two shafts pivotally supported in a plane or in parallel planes normal to the line of axial displacement of the end plate and not parallel to one another in a member relatively stationary to the end plate and each having at least two levers secured thereto which in combination with link linking them to the end plate permits displacement of the end plate without tilting. The end plate may be prevented from moving laterally by support means holding the end plate against side movement. Another form of the guide means may comprise at least one shaft or tubular sleeve secured to the displaceable end plate and extending therefrom and at least one tubular sleeve or shaft secured to a part held relatively stationary to the end plate and engaging and supporting the first mentioned shaft or tubular sleeve respectively so as to permit axial displacement of the end plate without tilting and without lateral movement.

The invention will now be described by way of example only with reference to the accompanying drawings in which:

Figure 2 is a cross-section through the pressure exchanger on a line A—A of Figure 1.

Figure 3 is a section through a pressure balancing cylinder with a multiplying lever-linkage system.

Figure 4 is a diagrammatic view of another lever linkage system.

Figure 5 is an end view of the cover of the pressure exchanger with a parallel motion lever linkage system.

Figure 6 is a cross-sectional view of the cover with lever linkage system.

Figure 1:
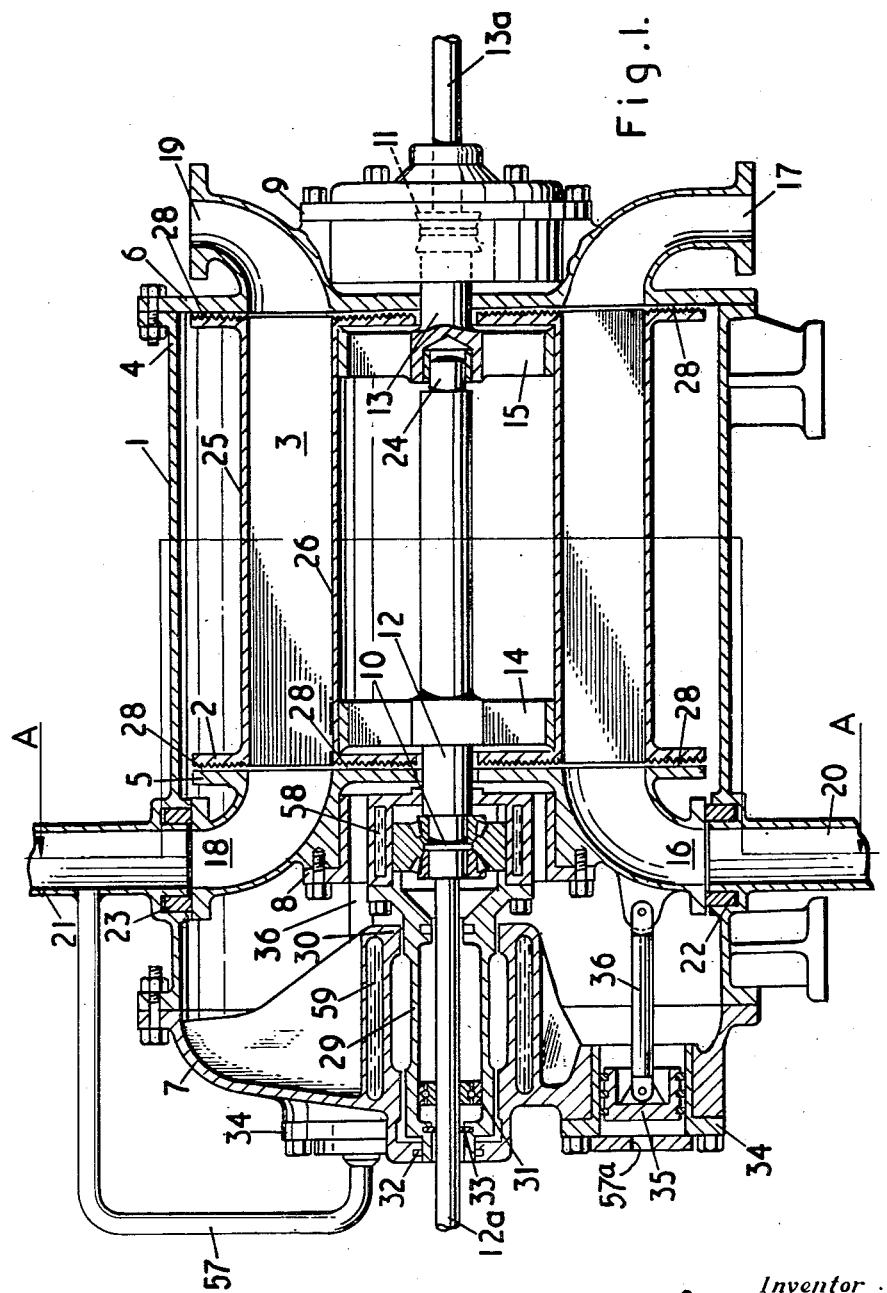
Figure 1 is a longitudinal section through a pressure exchanger.

In Figures 1 and 2 a pressure exchanger 1 has a rotor 2 of drum shape containing a circular series or a ring of cells 3 rotatable within a casing 4 between two end plates 5 and 6. The cells 3 are arranged with their longitudinal axes parallel with the axis of rotation of the ring of cells. The end plate 6 and a cover 7 are secured to the casing 4 enclosing the end plate 5 which is displaceably mounted therein so as to be axially moveable without any tendency to tilt or rotate. The two end plates 5 and 6 are provided respectively with bearing housings 8 and 9 respectively enclosing bearings 10 and 11 supporting the shafts 12—13 carrying the rotor 2 supported on spiders 14 and 15 adjacent to the ends of the rotor 2 and secured respectively to the shafts 12 and 13. As the rotor is secured to the shaft 12 and the bearing, e. g. as shown the double roller bearing 10, is fixed in position in relation to the bearing housing 8, it follows that the axial length of the gap between the rotor 2 and the end plate 5 is substantially fixed. Expansion of the rotor results in equal axial displacement of the end plate 5 and the adjacent end face of the rotor. Similar measures apply also to the end plate 6, shaft 13 and bearing 11. The two end plates 5 and 6 are formed with low pressure and high pressure inlet and outlet scavenging connections 16, 17, and 18, 19 through which low pressure fluid (air) and high pressure fluid (hot combustion gases) are passed for compression and expansion in the cells 3 in the rotor 2. The connections 16 and 18 on the movable end plate 5 are arranged in sliding gas tight connection with connections 20 and 21 formed on the casing 4. Gas tight seals 22 and 23 are provided between the connections 16, 20 and 18, 21 respectively to prevent loss of fluid when the end plate 5 is moved. The shafts 12—13 are provided adjacent the spider 15 with an expansion joint 24 allowing for expansion and contraction of the rotor 2 and shafts 12—13 relatively to one another.

The rotor 2 is formed of two concentric cylinders, an outer cylinder 25 and an inner cylinder 26 between which radial divisions 27 extend defining the cells 3. Labyrinth seals 28 are provided between the rotor 2 and the end plates 5 and 6 to prevent leakage from the cells 3 to the spaces within the casing 4. Rubbing contact seals of high temperature heat resisting and self lubricating carbonaceous materials may be used in place of the labyrinth seals 28. The casing 4 in conjunction with the cover 7 and the end plate 6 forms a closed vessel containing the rotor 2. The spaces around the rotor 2 may be maintained at a pressure level between the high pressure and the lower pressure of the fluids being expanded and compressed into the cells 3 to diminish the pressure losses from the cells 3.

The bearing housing 8 in the movable end plate 5 is provided with an axially extending sleeve 29 extending co-axially with the rotor shafts 12—13 towards the cover 7 and located within a boss 30 extending from the cover 7 towards the bearing housing 8. The sleeve 29 carries a bearing 31 for supporting an extension 12a of the shafts 12—13 of smaller diameter which projects through an opening in the cover 7. The sleeve 29 is arranged to slide axially within the boss 30 and is provided with a sealing member 33 and a seal for the sleeve 29 with the shaft extensions 12a and a seal 32 between the sleeve and opening in the cover 7. The rotor 2 is rotated by driving the shaft through either of its ends 12a or 13a or otherwise. The extended sleeve, together with the shaft and bearings with which it co-operates, forms an anti-tilting arrangement for the end plate 5.

It is desirable that the anti-tilting arrangement should be reinforced. It will be clear from Figure 1 that, with higher pressure fluid in the upper cells than in the lower cells, the end plate 5 will experience a torque tending to turn it in an anti-clockwise direction in the plane of the figure about its bearing 10. This torque is resisted by the anti-tilting arrangement and, in addition, three pressure balancing devices are introduced. There are the three cylinders 34 (see Figures 1 and 2) formed in the cover 7 and the pistons 35 therein are connected by rods 36 to the end plate 5. The pressure has to be exerted on the pistons so that the tendency for the end plate to be axially displaced and to be tilted may be further counteracted. The pressure balancing cylinders are arranged to take some of the load off the bearing 10, to reduce the tendency for the axial displacement of the end plate and to reduce the torque on the anti-tilting arrangement which has already been mentioned. As the pressures on the end plate are not symmetrically disposed, it is clear that the pressure on the pistons will not be equal if the result desired is to be attained.

In operation the connections 21 and 19 of the pressure exchanger 1 are joined to a high pressure fluid circuit (not shown) and the connections 20 and 17 are joined to a lower pressure circuit (not shown). As air is introduced through connection 16 to at least one of the cells the right end of the cell toward which it is passing is suddenly closed by means of the rotation of the cell wheel between the end plates. A pressure wave, thus produced, starts at the closed end and proceeds with the velocity of sound toward the open end from right to left, which end is also closed when the wave reaches it. This corresponds to what happens in a well-known hydraulic ram. The pressure rise depends upon the specific weight of the gas, its speed, and the rapidity of the closing operation. When the cell is filled with compressed air it travels to the upper part of the pressure exchanger where the second phase of compression takes place. The air pressure in the cell is still below that of the pressure of the combustion gases, so that when the left-hand side of the cell is opened, to conduit 18 the right-hand side being still closed the combustion gases rush in, compressing the air with a second pressure wave to its greatest pressure. As soon as the pressure wave gets to the right-hand end of the cell, this end of the cell is opened to conduit 19 and the whole content of the cell is in movement, the air being scavenged by the gas. Now the left-hand side of the cell is closed. As the gas is still in movement an expansion wave occurs, with a corresponding reduction in pressure. When the wave reaches the right-hand end of the cell, this end is closed too and the enclosed gas, at reduced pressure, travels in the cell down toward the exit conduit 17. The last pressure drop of the gas now takes place. The cell is opened at its right-hand end and the gas expands further. As the left-hand end of the cell is still closed, another expansion wave sets in, going from right to left. The result of this wave is a kind of Kadency effect which reduces the pressure in the cell still further, thus preparing it for the reception of more fresh air. The left-hand end of the cell is now opened to conduit 16 as soon as the expansion wave reaches it. The air scavenges the gas until the cell is filled with fresh air passing from left to right. The right-hand side of the cell again closes and the new cycle begins. Thus it can be seen that end plate 5 is subjected to a high pressure load at one point and to a lower pressure load at another point. The pressure difference between the high pressure load and the lower pressure load will tend to tilt the end plate 5 whilst both loads will tend to displace the end plate 5 axially and tend to increase the clearance between it and the rotor 2. In the Figure 1 embodiment the pistons 35 are supplied with fluid pressure to balance the loads on the end plate 5. Thus high pressure fluid from an appropriate point in the pressure exchanger 1 may be applied to the two pistons 35 on either side of the high pressure connection 21 (see Figure 2) through pipe 57 whilst atmospheric pressure may be applied to the piston 35 adjacent the lower pressure connection 20 through an orifice 57a. In this instance the space inside the cover is assumed to be at the intermediate pressure already referred to so that piston 35 of the lower cylinder will be subject to a force to the left as shown in the figure. Hence, moments are developed by the pressure balancing cylinders which relieve the stress on the extended sleeve arrangement which is opposing tendencies for tilting or lateral movement of the end plate.

In Figure 3 there is shown a multiplying lever-linkage system 36, 37, 38 which may enable a smaller piston and cylinder to be used. In this instance, of course, the movement of the piston is reversed and the pressure applied to a piston in such an arrangement has to be appropriately adjusted in order to produce the desired resultant. In Figure 4 there is shown another way in which the pressure balancing system may be constructed. This purely diagrammatic figure indicates that only a single cylinder and piston would be required. The piston rod 36 is connected to a lever 39 which is suspended from the cover by a link 40. The end plate 5, equipped with its anti-tilting arrangement and supported on its bearing as described above, is connected to the lever 39 by appropriately positioned rods 41 and 42. As shown in the figure, and assuming a pressure tending to move the piston 35 to the right, then the rod 41 will exert a pressure to the right on the end plate whilst the force on the end plate due to the existence of rod 42 will be in the opposite direction. It will be apparent that the positioning of the rods 41, 42 may be so arranged as to provide the appropriate forces on the end plate to counteract the torque on the anti-tilting arrangement and the tendency for axial displacement of the end plate.

The movable end plate 5 may be prevented from being displaced and tilted by the arrangement shown in Figures 5 and 6 as an alternative to the extended sleeve arrangement already described. The cover 7 is provided with a pair of shafts 43 and 44 which lie in parallel planes, intersect at an angle and are pivoted respectively in bosses 45, 46 and 47, 48. The shafts 43 and 44 have levers 49, 50 and 51, 52 respectively fixed to them and links 53, 54 and 55, 56 respectively connected to the end plate 5 and to the levers 49, 50 and 51, 51. Purely axial movement of the end plate causes equal longitudinal motion of the links, the respective levers and shafts turn, permitting the displacement. Tilting forces, however, try to move links connected to the same shaft in opposite longitudinal sense. Torsional forces then are induced in a shaft, which it accommodates thereby preventing any tilting. This mechanism, in taking the place of the sleeve extension 29 to the bearing housing 8 shown in Figure 1, renders the tubular boss 30 unnecessary and the shaft 12a emerges through a gland in the cover 7. In other respects the end plate mounting and the bearing for the end plate and rotor are as shown in Figure 1.

Co-operating with the anti-tilting arrangement of the pair of shafts 34 and 44 there may be arranged a single pressure balancing cylinder 34 with piston 35 and piston rod 36 to counter balance loads due to the high pressure balancing cylinder 34 and piston 35 a diaphragm motor or an expansible bellows may be used acting directly or indirectly on the end plate 5 through a lever-linkage system as described above. The pressure balancing piston or diaphragm motor or bellows is preferably disposed to act substantially in an axial direction and the pressure fluid required to operate it may be derived from an appropriate region of the pressure exchanger.

In the pressure exchanger in which it is necessary for two movable end plates to be provided between which is disposed a rotor or rotors, each end plate is constructed and arranged to be capable of axial movement to allow for thermal growth or limited axial displacement of the rotor or rotors substantially as described above for the single movable end plate. Where two movable end plates require balancing, one end plate may be balanced by one or more pressure balancing pistons, diaphragms or bellows directly whilst the other end plate may be balanced indirectly from the same pistons, diaphragms or bellows through levers and links.

Obviously where pistons movable in cylinders are used to provide the balancing force, the cylinders may be attached to the end plate and the pistons to the non-movable part of the machine which is opposite to that described and shown in the drawings.

In order to obtain good results from the invention it may be desirable to heat or cool certain parts by leading working fluid from other parts of the pressure exchanger and conducting such fluid to flow in contact with the parts such as the rotor shaft and bearings whose temperature it is desired to control, the object being to reduce the temperature gradients or to establish certain temperatures at particular parts of the exchanger.

In a pressure exchanger in which one of the fluids is at a high temperature it may be necessary to cool certain parts such as the bearings and adjacent supporting structure. In Figure 1 the bearing housing 8 is shown with a liquid cooling jacket 58 surrounding the bearing 10 and the boss 30 is shown provided with a liquid cooling jacket 59 surrounding the sleeve 29.

What I claim is:

1. A pressure exchanger comprising in combination a cell ring, an end plate and outlet means; said end plate and outlet means being mounted coaxially with said cell ring for relative rotation; said cell ring defining a series of open-ended cells extending therethrough; said end plate including inlet means on an end of said cell ring to allow the introduction of low pressure fluid into said cells, a second inlet means circumferentially displaced from said first means to allow the introduction of high pressure fluid into said cells; said outlet means being slightly circumferentially off-set respectively from said high and from said low pressure inlet means also on an end of said cell ring whereby the pressure of the low pressure fluid is raised and the pressure of the high pressure fluid is lowered in said cells during relative rotation of said cell ring, end plate and outlet means, thereby producing a pressure gradation circumferentially of the axis of rotation of said cell ring, end plate and outlet means; a supporting arrangement for maintaining at variable temperatures a predetermined clearance between the cell ring and the end plate comprising a bearing means supporting the cell ring and the end plate and a mounting supporting said bearing means and permitting said end plate to be axially displaced so that axial thermal expansion of the cell ring effects equal axial movement of the end plate.

2. In a pressure exchanger a supporting arrangement as claimed in claim 1 in which said bearing means comprises a thrust bearing, bearing housing and shafting carried by said thrust bearing which support both cell ring and end plate.

3. In a pressure exchanger a supporting arrangement as claimed in claim 2 in which said mounting comprises anti-tilting means for counteracting the tendency of the end plate to tilt due to unequal pressure being applied to diametrically opposed portions of the end plate.

4. In a pressure exchanger a supporting arrangement as claimed in claim 3 in which said anti-tilting means comprises a parallel motion mechanism.

5. In a pressure exchanger, a supporting arrangement as claimed in claim 4 in which said anti-tilting means comprises a member interconnected with said end plate and stationary relative thereto, at least two shafts in parallel planes normal to the line of axial movement of the end plate and not parallel to one another pivotally supported in said stationary member, two levers secured to each shaft and rigid links connecting each lever to the end plate.

6. A pressure exchanger comprising in combination a cell ring, an end plate and outlet means; said end plate and outlet means being mounted coaxially with said cell ring for relative rotation; said cell ring defining a series of open-ended cells extending therethrough; said end plate including inlet means on an end of said cell ring to allow the introduction of low pressure fluid into said cells, a second inlet means circumferentially displaced from said first means to allow the introduction of high pressure fluid into said cells; said outlet means being slightly circumferentially off-set respectively from said high and from said low pressure inlet means also on an end of said cell ring whereby the pressure of the low pressure fluid is raised and the pressure of the high pressure fluid is lowered in said cells during relative rotation of said cell ring, end plate and outlet means, thereby producing a pressure gradation circumferentially of the axis of rotation of said cell ring, end plate and outlet means; a supporting arrangement for maintaining at variable temperatures a predetermined clearance between the cell ring and the end plate comprising a bearing means supporting the cell ring and the end plate, a member interconnected with said end plate and stationary relative thereto, a co-axially extending shaft and sleeve combination one part of which is secured to and extends from the end plate while the other part is secured to and extends from said stationary member, this combination opposing any tilting tendency of the end plate, and a mounting supporting said bearing means and permitting said end plate to be axially displaced so that axial thermal expansion of the cell ring effects equal axial movement of the end plate.

7. A pressure exchanger comprising in combination a cell ring, an end plate and outlet means; said end plate and outlet means being mounted coaxially with said cell ring for relative rotation; said cell ring defining a series of open-ended cells extending therethrough; said end plate including inlet means on an end of said cell ring to allow the introduction of low pressure fluid into said cells, a second inlet means circumferentially displaced from said first means to allow the introduction of high pressure fluid into said cells; said outlet means being slightly circumferentially off-set respectively from said high and from said low pressure inlet means also on an end of said cell ring whereby the pressure of the low pressure fluid is raised and the pressure of the high pressure fluid is lowered in said cells during relative rotation of said cell ring, end plate and outlet means, thereby producing a pressure gradation circumferentially of the axis of rotation of said cell ring, end plate and outlet means; a supporting arrangement for maintaining at variable temperatures a predetermined clearance between the cell ring and the end plate comprising a bearing means supporting the cell ring and the end plate, at least one fluid operated pressure balancing device acting upon the end plate to reduce the load upon said bearing means and a mounting supporting said bearing means and permitting said end plate to be axially displaced so that axial thermal expansion of the cell ring effects equal axial movement of the end plate.

8. In a pressure exchanger, a supporting arrangement as claimed in claim 7 in which said pressure balancing device comprises a cylinder, a piston head sliding in the cylinder and a connection through which fluid has access to the piston head.

9. A pressure exchanger comprising in combination a cell ring, an end plate and outlet means; said end plate and outlet means being mounted coaxially with said cell ring for relative rotation; said cell ring defining a series of open-ended cells extending therethrough; said end plate including inlet means on an end of said cell ring to allow the introduction of low pressure fluid into said cells, a second inlet means circumferentially displaced from said first means to allow the introduction of high pressure fluid into said cells; said outlet means being slightly circumferentially off-set respectively from said high and from said low pressure inlet means also on an end of said cell ring whereby the pressure of the low pressure fluid is raised and the pressure of the high pressure fluid is lowered in said cells during relative rotation of said cell ring, end plate and outlet means, thereby producing a pressure gradation circumferentially of the axis of rotation of said cell ring, end plate and outlet means; a supporting arrangement for maintaining at variable temperatures a predetermined clearance between the cell ring and the end plate comprising a bearing supporting said end plate, shafting supporting said cell ring and running in said bearing, a telescopic joint in said shafting to allow for axial expansion of the cell ring and a mounting supporting said bearing and permitting said end plate to be axially displaced so that axial thermal expansion of the cell ring effects equal axial movement of the end plate.

References Cited in the file of this patent

UNITED STATES PATENTS

| | | |
|---|---|---|
| 2,045,152 | Lebre | June 23, 1936 |
| 2,399,394 | Seippel | Apr. 30, 1946 |
| 2,461,186 | Seippel | Feb. 8, 1949 |